(12) United States Patent
Park et al.

(10) Patent No.: US 8,135,272 B2
(45) Date of Patent: Mar. 13, 2012

(54) SUB MIRROR AND IMAGE PICK-UP APPARATUS HAVING THE SAME

(75) Inventors: Kyong-Tae Park, Suwon-si (KR); Shitao Deng, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 37 days.

(21) Appl. No.: 12/560,806

(22) Filed: Sep. 16, 2009

(65) Prior Publication Data

US 2010/0104271 A1   Apr. 29, 2010

(30) Foreign Application Priority Data

Oct. 24, 2008   (KR) .................. 10-2008-0105033

(51) Int. Cl.
*G03B 7/099* (2006.01)

(52) U.S. Cl. .................. 396/111; 348/335; 359/853

(58) Field of Classification Search .................. 396/111; 348/335; 359/853
See application file for complete search history.

(56) References Cited

U.S. PATENT DOCUMENTS

| | | | | |
|---|---|---|---|---|
| 3,601,027 | A | * | 8/1971 | Ono .............................. 396/272 |
| 4,181,412 | A | * | 1/1980 | Holle et al. .................... 396/272 |
| 5,212,514 | A | * | 5/1993 | Goto ............................. 396/114 |
| 5,839,001 | A | | 11/1998 | Ohtaka et al. |
| 2005/0195408 | A1 | * | 9/2005 | Phillips ........................ 356/521 |
| 2008/0049291 | A1 | * | 2/2008 | Baek et al. ................... 359/223 |

FOREIGN PATENT DOCUMENTS

| | | |
|---|---|---|
| EP | 0 782 026 | 7/1997 |
| JP | 1-284812 | 11/1989 |

OTHER PUBLICATIONS

European Search Report issued in European Application No. EP 09 17 0379, issued Oct. 27, 2009.
English language abstract of JP 1-284812, published Nov. 16, 1989.

* cited by examiner

*Primary Examiner* — Christopher Mahoney
*Assistant Examiner* — Fang-Chi Chang
(74) *Attorney, Agent, or Firm* — The Farrell Law Firm, P.C.

(57) ABSTRACT

An image pick-up apparatus which is capable of increasing an AF area is provided. The image pick-up apparatus includes a photographing lens to focus light received from a subject, a main mirror that passes a portion of light passing through the photographing lens and that reflects the remaining portion of the light, an auto focus module to detect the state of focus the photographing lens and a sub-mirror having a plurality of reflective areas that reflect respectively divided portions of the light passing through the main mirror and that guide the divided light portions to the auto focus module.

16 Claims, 7 Drawing Sheets

PRIOR ART

SUB MIRROR AND IMAGE PICK-UP APPARATUS HAVING THE SAME

CROSS-REFERENCE TO RELATED APPLICATIONS

This application claims priority under 35 U.S.C. §119 from Korean Patent Application No. 10-2008-105033, filed on Oct. 24, 2008, in the Korean Intellectual Property Office, the disclosure of which is incorporated herein by reference in its entirety.

TECHNICAL FIELD

The present disclosure in various aspects relates generally to an image pick-up apparatus, and, more particularly, to a sub-mirror which guides light received from a subject to an auto focus module of an image pick-up apparatus.

BACKGROUND OF RELATED ART

An image pick-up apparatus or an image acquisition apparatus, such as, for example, a camera, may include an auto focusing function to automatically focus on a subject for the convenience of user. The auto focusing function mainly uses a through the lens (TTL) auto focusing method which uses the light entering through a photographing lens. An auto focus module detects whether a subject is in focus using, for example, a contrast detection method or a phase difference detection method. In the TTL auto focusing method, a sub-mirror is typically used for guiding the light entering through the photographing lens to the auto focus module.

In general, an AF area which indicates an area measurable by the auto focus module is smaller than the image pick-up area. This is mainly because the size of the sub-mirror is geometrically limited. Enlarging the AF area is a subject currently under study.

The manufacturing and/or assembly imprecision, which may in some cases be within the allowable tolerance, during the fabrication and/or assembly of the optical components in the image pick-up apparatus may result in an auto focusing error. An image pick-up apparatus of a robust design that is as impervious to the manufacturing and/or assembly tolerance as practicable may thus be desired.

An auto focus module adds to the size of the image pick-up apparatus, which size may be an important consideration for a consumer when making a purchasing decision. A reduction in size of the auto focus module may thus also be desirable.

SUMMARY OF DISCLOSURE

According to an aspect of the present disclosure, an image pick-up apparatus may be provided to include a photographing lens, a main mirror, an auto focus module and a sub-mirror. The photographing lens may be configured to receive light from a subject. The main mirror may be configured to receive light from the photographing lens and to partially transmit therethrough the light received from the photographing lens. The auto focus module may be configured to detect a focus state of the photographing lens. The sub-mirror may comprise a plurality of reflective areas each configured to reflect a portion of the light transmitted through the main mirror and to direct the reflected portion of the light along an optical path from the sub-mirror to the auto focus module.

Each of the plurality of reflective areas may have a concave shape.

The optical path from the sub-mirror to the auto focus module may not comprise a field lens.

The plurality of reflective areas may be arranged along a horizontal direction of the sub-mirror.

The plurality of reflective areas may alternatively be arranged along a vertical direction of the sub-mirror.

The plurality of reflective areas may comprise three reflective areas.

The main mirror and the sub-mirror may be arranged in such manner that the light reflected by the sub-mirror is reflected by the main mirror toward the auto focus module.

The sub-mirror may be arranged perpendicular to an optical axis of light passing through the photographing lens.

The reflectivity of the main mirror may be greater than or equal to about 60% and less than or equal to about 70%.

According to another aspect, an auto focusing apparatus for detecting a focus state of a subject image of an image acquiring apparatus may be provided to comprise an auto focus module and a sub-mirror. The auto focus module may comprise one or more image sensors arranged along an optical path of light received from a subject so as to sense the subject image. The sub-mirror may be arranged in the optical path between the subject and the auto focus module. The sub-mirror may comprise a plurality of reflective areas each configured to reflect a portion of the light incident upon the sub-mirror and to direct the reflected portion of the light along an optical path from the sub-mirror to the auto focus module.

The auto focusing apparatus may further comprise a main mirror arranged in the optical path upstream of the sub-mirror and configured to partially transmit light incident thereupon. The main mirror and the sub-mirror may be arranged in such manner that the light reflected by the sub-mirror is reflected by the main mirror toward the auto focus module.

According to yet another aspect of the present disclosure, a sub-mirror capable of being arranged in an optical path of light between a subject of an image acquisition apparatus and an auto focus module of the image acquisition apparatus that detects a focus state of an image of the subject may be provided to comprise a plurality of reflective surfaces each configured to reflect a portion of the light incident upon the sub-mirror and to direct the reflected portion of the light along an optical path from the sub-mirror to the auto focus module.

The sub-mirror may be arranged in the optical path downstream of a main mirror of the image acquisition apparatus in such manner that the light reflected by the sub-mirror is reflected by the main mirror toward the auto focus module.

According to even yet another aspect, an image acquisition apparatus for acquiring an image of a subject may be provided to comprise a main mirror and a sub-mirror. The main mirror may be arranged in an optical path of light received from the subject, and may be configured to partially transmit therethrough light incident thereupon. The sub-mirror may be arranged in the optical path downstream of the main mirror, and may comprise a plurality of reflective surfaces each configured to reflect a respective different portion of light transmitted through the main mirror.

Each of the plurality of reflective surfaces may be configured reflect the respective portion of the light back toward the main mirror.

The plurality of reflective surfaces may each comprise at least a portion thereof that is perpendicular to an optical axis of light incident upon the main mirror.

The image acquisition apparatus may further comprise an auto focus module that includes an image sensor configured to convert the light received from the subject into an electrical signal and a reflective mirror configured to receive light from the main mirror and to reflect the received light toward the image sensor.

Each of the plurality of reflective surfaces may comprise a non-planar surface.

BRIEF DESCRIPTION OF THE DRAWINGS

Various aspects of the disclosure will become apparent and more readily appreciated from the following description of the embodiments, taken in conjunction with the accompanying drawings, in which.

DETAILED DESCRIPTION OF SEVERAL EMBODIMENTS

Figure 1:
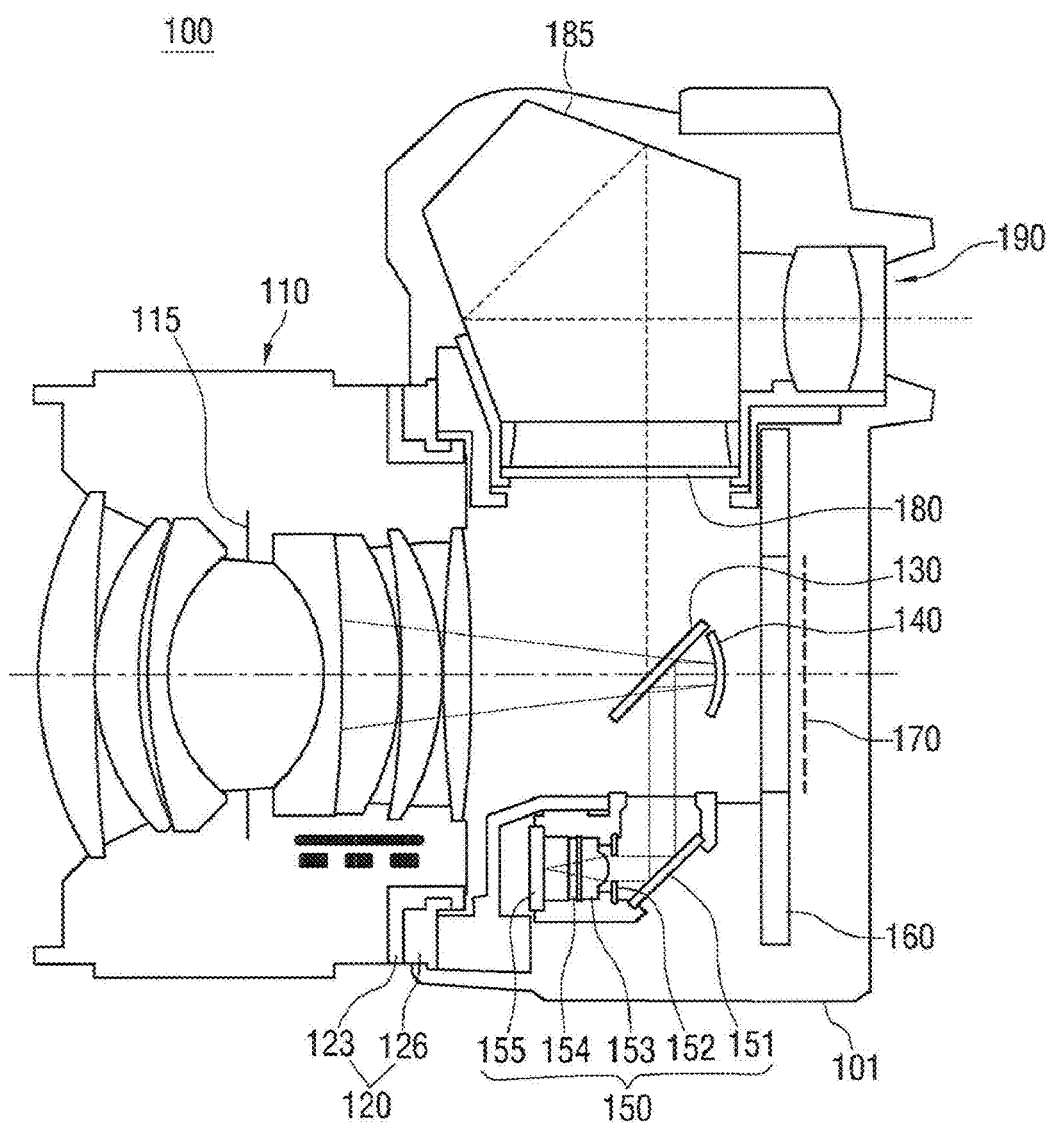
FIG. 1 schematically illustrates an image pick-up apparatus according to an embodiment of the present disclosure.
Figure 2:
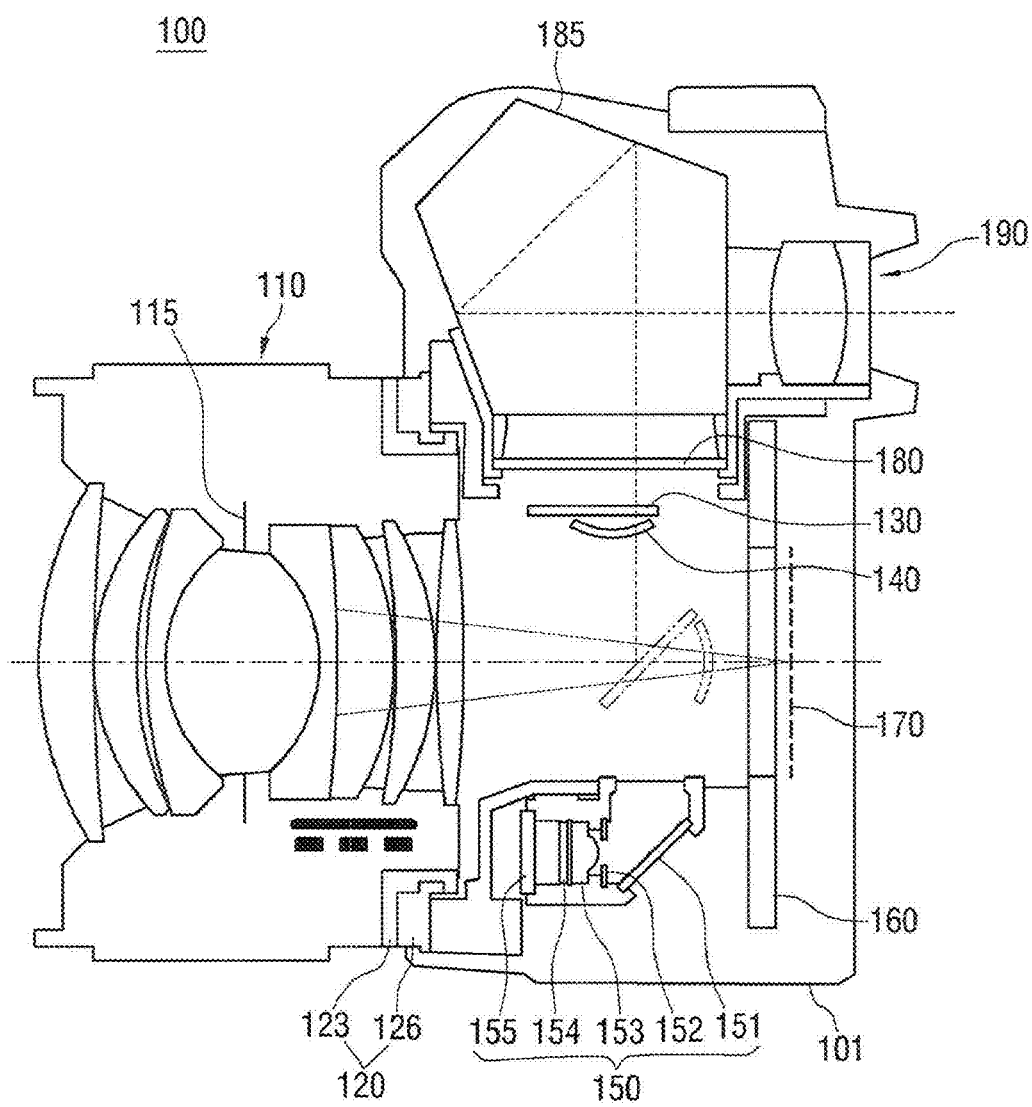
FIG. 2 shows the image pick-up apparatus of FIG. 1, in which a subject image is acquired.

Several embodiments of the present invention will now be described in greater detail with reference to the accompanying drawings. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding FIG. 1 shows an image pick-up apparatus 100 according to an embodiment of the present disclosure. FIG. 2 illustrates the image pick-up apparatus 100 when a subject image is picked up.

According to an embodiment, the image pick-up apparatus 100 may be a digital single lens reflect (DSLR) camera. It should be noted however that while a DSLR camera is described as an example, for the sake of convenience in explaining one or more aspects of the present disclosure, these various aspects can be applied to any image pick-up apparatus.

Referring to FIG. 1, the image pick-up apparatus according to an embodiment may comprise a photographing lens 110, a mount 120, a main mirror 130, a sub-mirror 140, an auto focus module 150, a focal plane shutter 160, an image pick-up area 170, a focusing screen 180, a penta prism 185 and an eyepiece 190.

The photographing lens 110 may focus the light received from a subject on the image pick-up area 170. As shown in FIG. 1, the photographing lens 110 according to an embodiment may comprise a plurality of lenses, and may be interchangeable, such as it would typically be in the case of a DSLR camera, for example.

The photographing lens 110 may further comprise an image stabilizing apparatus (not shown) and an auto focus driver (not shown). An image stabilizing apparatus may correct or compensate for blurring of the image that may result due to the movement of the image pick up apparatus, for example, by the shaking of the user's hand. The auto focus driver may receive information about the in focus status of the photographing lens 110 from the auto focus module 150, and may move the photographing lens 110 or a portion thereof based on the information.

The photographing lens 110 may comprise a diaphragm 115. The diaphragm 115 may operate to regulate the amount of light that passes through the photographing lens 110, and, in so doing, may affect the depth of field of the resulting image. That is, if the diaphragm 115 is enlarged or made wider, a larger amount of light may pass through the photographing lens 110 so that the user can obtain a brighter photograph. However, the wider aperture resulting from the enlarged diaphragm 115 may also reduce the depth of field of the photograph. On the other hand, if the diaphragm 115 is made narrow, the photographing lens 110 passes much less light, resulting in a darker photograph. However, with the resulting smaller aperture, an increased depth of field may be attainable.

The diaphragm 115 may be arranged among the lenses such that an image may be formed by the lenses. That is, an image of the diaphragm 115, which may typically be a virtual image, and which may be formed by the lens or lenses arranged in front of the diaphragm 115 (i.e., between the subject and the diaphragm) may be referred to as an entrance pupil while the image, which is also typically a virtual image, and which may be formed by the lens or lenses behind the diaphragm 115 (i.e., between the diaphragm and the image pick-up area) may be referred to as an exit pupil. Since the exit pupil is an image of the diaphragm 15 that plays an important role in the brightness of the resulting photograph, it may be an important factor in controlling brightness and auto focusing.

The mount 120 may allow the photographing lens 110 to be mounted to the body 101 of the image acquisition apparatus 100. The mount 120 may be configured so as to align the center of the image pick-up area 170 to coincide with the optical axis of the photographing lens 110. in some embodiments, the mount 120 allows a removable mounting of the photographing lens 110 so that photographing lens 110 may be interchangeable.

The mount 120 may comprise a lens mount 123 and a body mount 126. The lens mount 123 and the body mount 126 may be configured to engage each other such that the photographing lens 110 may be securely mounted to the body 101 of the image acquisition apparatus 100.

The main mirror 130 may allow a partial transmission therethrough of the light that has passed through the photographing lens 110, and may reflect the remainder of the light. The light reflected from the main mirror 130 may become incident upon the focusing screen 180 so that the user can see an image of the subject through the eyepiece 190. The light passing through the main mirror 130 may be guided by the sub-mirror 140 toward the auto focus module 150 so that the auto focus module 150 can detect the in focus state of the subject. The sub-mirror 140 will be described in greater detail below.

The auto focus module 150 may detect the focus state of the photographing lens 110. Information regarding the focus state of the photographing lens 110 is transmitted to the auto focus driver (not shown) of the photographing lens 110. For the sake of brevity and convenience, but not as a limitation, hereinafter, an auto focus module 150 that uses the phase difference detection method of auto focusing will be described as an example. The auto focus module 150 according to an embodiment may comprise a reflective mirror 151, a visual field mask 152, a separating lens 153, a filter 154 and an auto focus sensor 155.

The reflective mirror 151 may reflect the light incident on the auto focus module 150 toward the auto focus sensor 155. To this end, the reflective mirror 151 allows an efficient space utilization within the image pick-up apparatus 100 by allowing the light path to change its direction so that the height of the image pick-up apparatus 100 can be less than it would otherwise be necessary.

The visual field mask 152 may comprise a plurality of openings. The light passing through the plurality of openings passes through the separating lens 153, forming a plurality of subject images on the auto focus sensor 155.

The filter 154 may filter out the light rays in the invisible spectrum in order to avoid the possible error when an attempt to detect the focus state of the photographing lens 110 is made with the auto focus sensor 155 also receiving light rays in the invisible spectrum. To that end, the filter 154 may be, for example, an infrared rays cut off filter.

The auto focus sensor 155 may comprise a plurality of photoelectric elements arranged in a specific area. The subject image formed on the auto focus sensor 155 is converted into electric signals by the photoelectric elements. Using the electric signals, the focus state of the photographing lens 110 can be sensed. Since the phase difference detection method is well known to those skilled in the art, a detailed description thereof is unnecessary and is thus omitted.

The focal plane shutter 160 may be disposed in front of the image pick-up area 170, and may be formed of two sheets of black curtain or metallic curtains, which are typically called respectively a front curtain and a rear curtain. The focal plane shutter 160 may operate in a manner that the front curtain is opened to expose the image pick-up area 170 to the light in photographing operation while the rear curtain is closed to interrupt the passage of light through the image pick-up area 170. That is, the focal plane shutter 160 uses the time difference between the front curtain and the rear curtain to regulate the shutter speed.

The image pick-up area 170 is an area that is exposed to the light so that the subject image is acquired. When the subject image is picked up, the main mirror 130 and the sub mirror 140 may be withdrawn from the optical path as shown in FIG. 2. In a film camera, a film is placed on the image pick-up area 170. In a digital camera, one or more image sensors are arranged in the image pick-up area 170. Such image sensors may be classified into, for example, charge coupled devices (CCD) and complementary metal oxide semi-conductors (CMOS). A CCD sensor due to its sensitivity to even weak level of light may be able to obtain a high quality image, and has thus seen a wide usage in most of the digital cameras. However, the CCD has the disadvantages of a complicated manufacturing process and a high manufacturing cost. Compared to the CCD sensors, the CMOS sensors have been used mainly as sensors for low-cost digital cameras due to the lower manufacturing cost and the easier manufacturing process. Recent advances in the image processing technology however improve the image quality achievable with CMOS sensors significantly, resulting in the use of CMOS sensors to become widespread in DSLR cameras, even among professional users.

The focusing screen 180 may comprise a mat surface and a Fresnel lens. The mat surface is arranged in a position optically equivalent to a focal surface in photographing operation. Accordingly, the same image as the photographed image may be shown on the mat surface. The Fresnel lens may collect the light passing through the mat surface to allow the user to see a brighter image through the eyepiece 190.

The penta prism 185 (meaning a pentagon shaped prism) may convert a laterally-reversed image (i.e., reversed left to right but not top to bottom) into a normally oriented image. Accordingly, the user can see the same image through a view finder (i.e., through the eyepiece 190) as it would be photographed.

The eyepiece 190 makes a virtual image, for example, one meter ahead to allow the user to see an image formed on the focusing screen 180. Accordingly, the user can seen the image to be photographed through the eyepiece 190.

Figure 3:
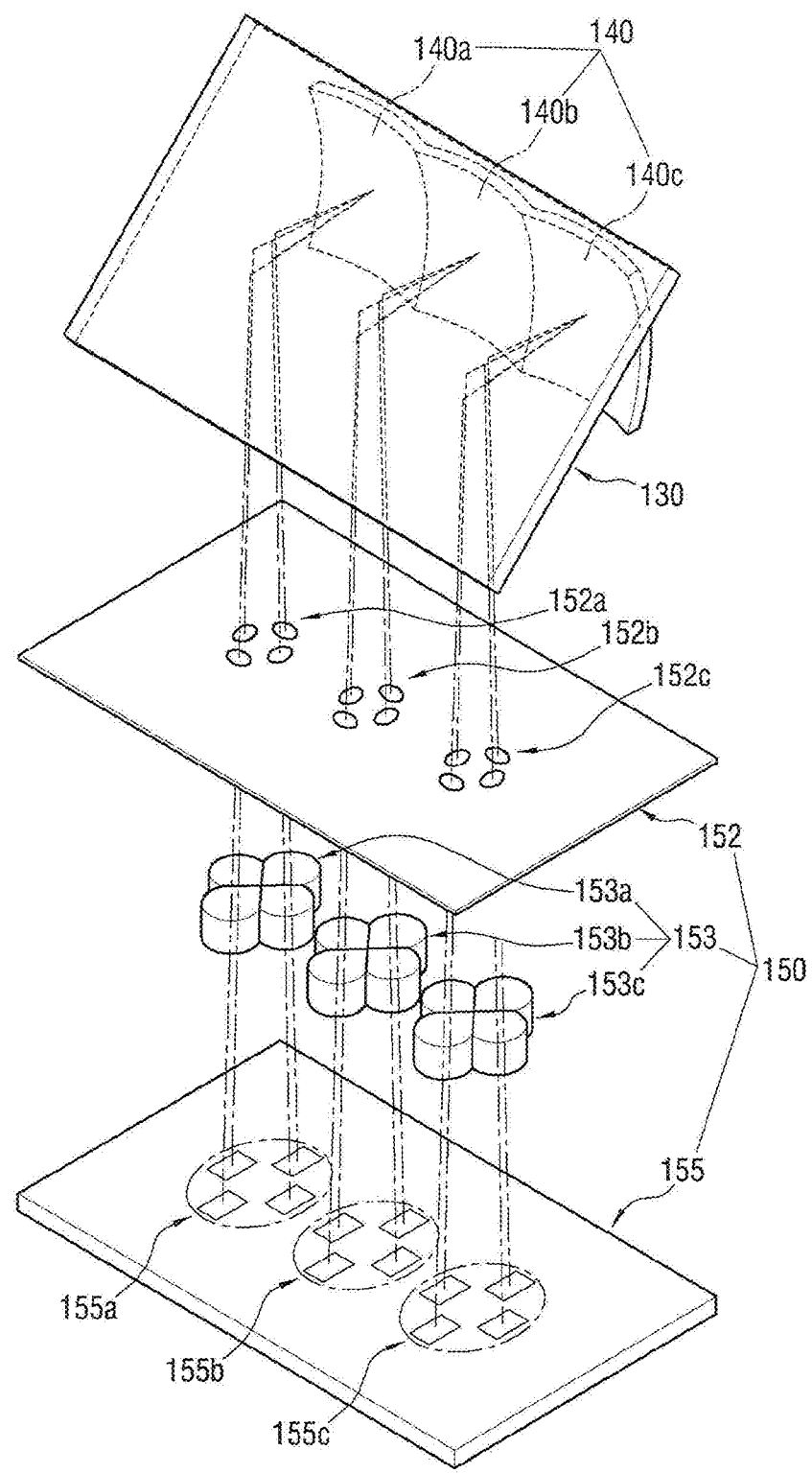
FIG. 3 schematically illustrates a sub-mirror and an auto focus module according to an embodiment of the present disclosure usable in an image pick-up apparatus, e.g., the one shown in FIG. 1.

The sub-mirror 140 will now be described in greater detail with reference to FIG. 3. FIG. 3 schematically illustrates the sub-mirror 140 and the auto focus module 150. For the sake of brevity, the reflective mirror 151 and the filter 154 are not illustrated in FIG. 3.

The sub-mirror 140 may comprise a plurality of reflective areas 140a, 140b and 140c to divide the light passing through the main mirror 130, and may guide the light to the auto focus module 150. According to an embodiment, the reflective areas 140a, 140b and 140c may be formed in a concave shape so as to each collect the light. That is, according to an aspect of the present disclosure, since the reflective areas 140a, 140b and 140c can replace a field lens, which would otherwise be required in a conventional auto focus module, an auto focus module 150 of a smaller size and/or of lower manufacturing cost may be realizable.

According to an embodiment of the present disclosure, the reflective areas 140a, 140b and 140c may be arranged in the horizontal direction of the sub-mirror 140 as shown in FIG. 3. However, the reflective areas 140a, 140b and 140c may alternatively be arranged in the vertical direction of the sub-mirror 140. To the extent the sub-mirror 140 is able to divide the light passing through the main mirror 130, the number of reflective areas 140a, 140b and 140c or their shapes can vary.

The light reflected from the first reflective area 140a may be reflected again by the main mirror 130, and may pass through a first opening 152a of the visual field mask 152 and through a first separating lens 153a to thereby be focused on a first photoelectric element 155a of the auto focus sensor 155. The light reflected from the second reflective area 140b may be reflected again by the main mirror 130, and may pass through a second opening 152b of the visual field mask 152 and through a second separating lens 153b to thereby be focused on a second photoelectric element 155b of the auto focus sensor 155. The light reflected from the third reflective area 140c may be reflected again by the main mirror 130, and may pass through a third opening 152c of the visual field mask 152 and through a third separating lens 153c to thereby be focused on a third photoelectric element 155c of the auto focus sensor 155. The focus state of the photographing lens 100 can be determined by analyzing the electric signals converted by each of the photoelectric elements 155a, 155b and 155c using the phase difference detection method.

In order for a stable operation of the auto focus module 150, the auto focus module 150 may need to receive a sufficient amount of light. However, if an excessive amount of light is received by the auto focus module 150, the amount of light reflected from the main mirror 130 and subsequently reaching the eyepiece 190 may be reduced, making it difficult for the user to see a clear image of the subject. Accordingly, the amount of light entering the auto focus module 150 may need to be appropriately regulated.

For example, if the reflectivity of the main mirror 140 is 70%, the amount of light reflected by the main mirror 130 toward the eyepiece 190 is 70% of the total amount of light while 30% of the total amount of light passes through the main mirror 130, and is reflected from the sub-mirror 140. Subsequently, since the light is reflected again by the main mirror 130 with reflectivity of 70%, only 21% of the total amount of light (30%×70%) may be received by the auto focus module 150. By way of another example, if the reflectivity of the main mirror 140 is 60%, the amount of light reflected toward the eyepiece 190 is 60% of the total amount of light while the amount of light received by the auto focus module 150 is 24% of the total amount of light (40%×60%). If the reflectivity of the main mirror 140 is from about 60% to about 70%, the auto focus module 150 can operate stably while allowing the user to see the subject image in sufficient clarity through the eye piece 190.

Figure 4:
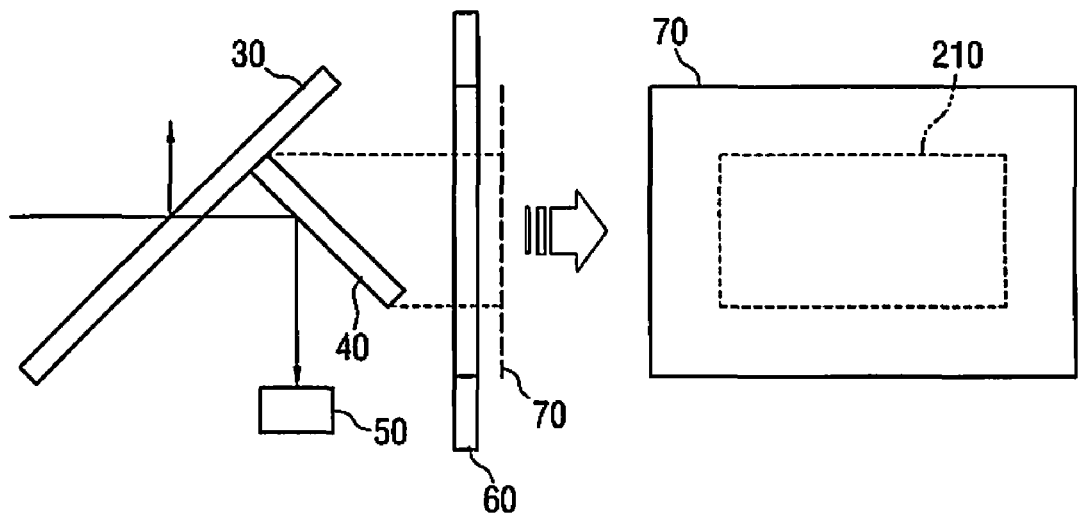
FIG. 4 illustrates an AF area of a conventional image pick-up apparatus.
Figure 5:
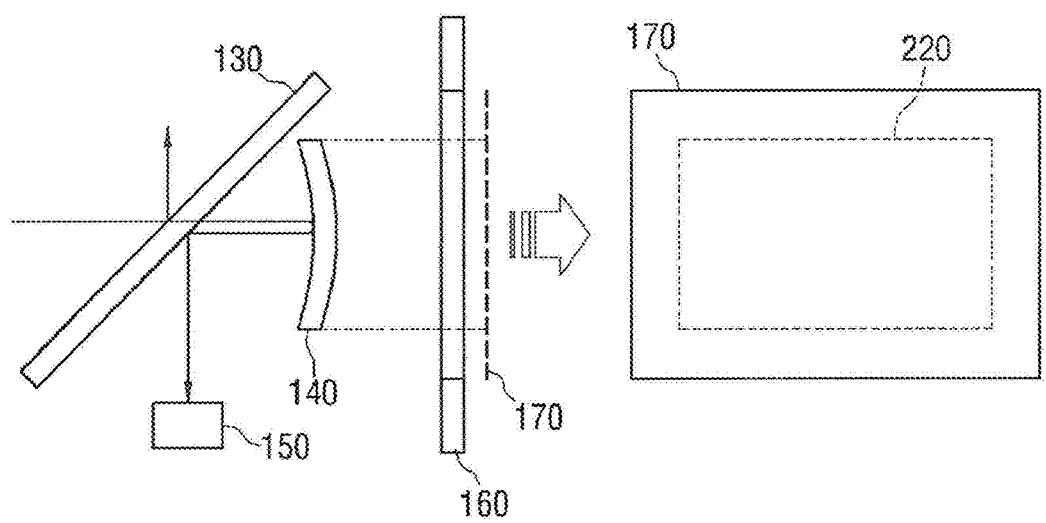
FIG. 5 illustrates an AF area of the image pick-up apparatus according to an embodiment of the present disclosure, including, e.g., the one shown in FIG. 1.

With reference to FIGS. 4 and 5, the AF area of a conventional image pick-up apparatus is compared with the AF area of the image pick-up apparatus according to an embodiment of the present disclosure. FIG. 4 illustrates the AF area of a conventional image pick-up apparatus while FIG. 5 illustrates the AF area of the image pick-up apparatus according to an embodiment of the present disclosure.

As shown in FIG. 4, in a conventional image pick-up apparatus, the light passing through a main mirror 30 is reflected from a sub-mirror 40, and is directly incident on an auto focus module 50. Since the sub-mirror 40 is inclined with respect to the optical axis of the light passing through a photographing lens, the AF area 210 is small. An attempt to increase the size of the sub-mirror 40 may result in the sub-mirror 40 interfering with a focal plane shutter 60. There is thus a limitation on the size of the sub-mirror 40. Therefore, the AF area 210 of a conventional image pick up apparatus is significantly limited compared to the image pick-up area 70.

In comparison, according to an embodiment of the present disclosure, as shown in FIG. 5, the light passing through the main mirror 130 is reflected from the sub-mirror 140, and is reflected again by the main mirror 130 before being incident upon the auto focus module 150. Accordingly, compared to the AF area 210 of the conventional image pick-up apparatus, the AF area 220 of the image pick-up apparatus according to an embodiment of the present disclosure may be larger. According to an embodiment, in order to maximize the AF area 220, the sub-mirror 140 may desirably be disposed perpendicular to the optical axis of the light passing through the photographing lens.

Figure 6:
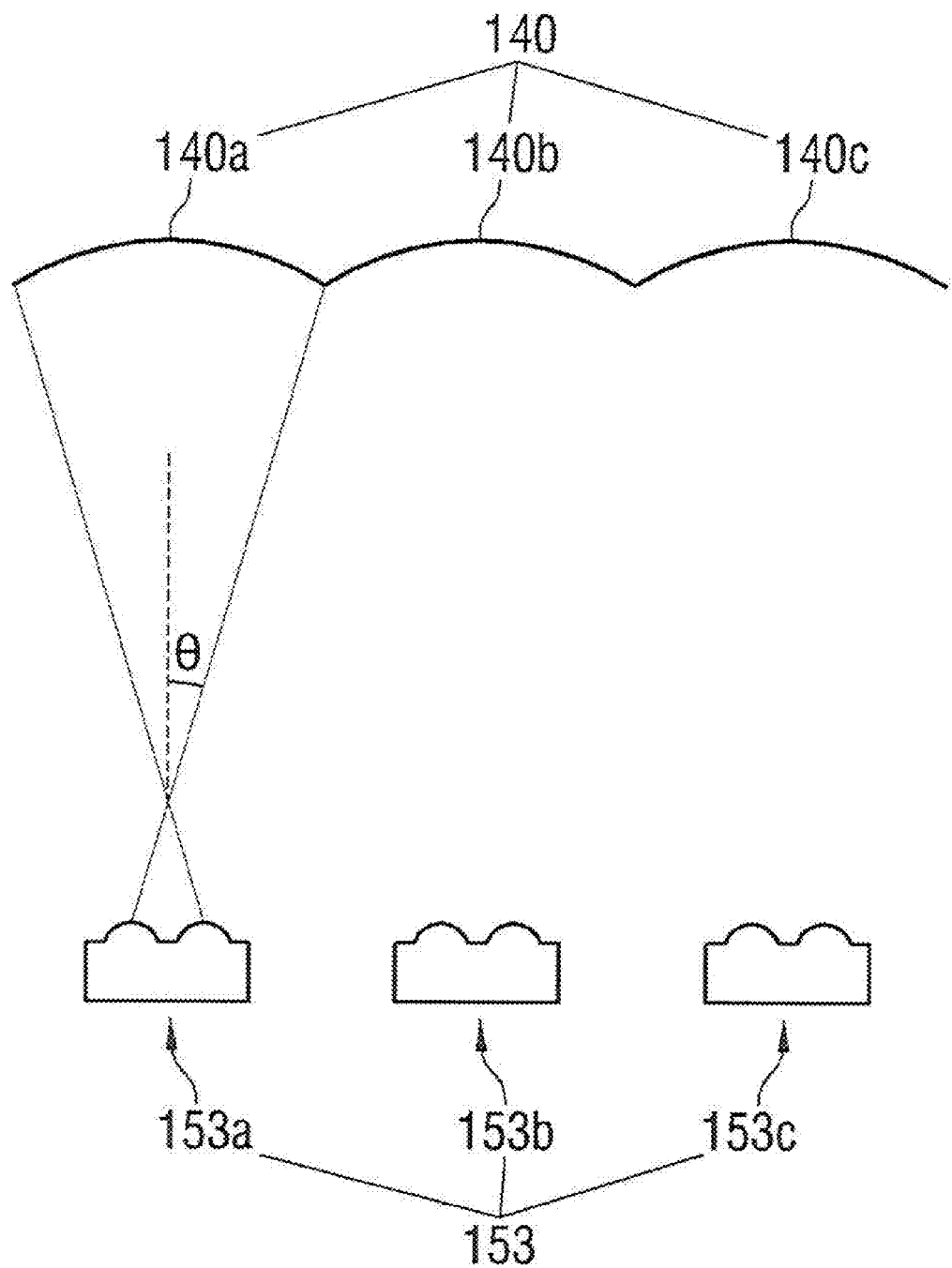
FIG. 6 illustrates an incident angle of the light entering a separating lens after being reflected from the sub-mirror according to an embodiment of the present disclosure.

FIG. 6 illustrates an incident angle of light incident on the separating lens 153 after being reflected from the sub-mirror 140. For brevity, the reflective mirror 151 and the visual field mask 152 are not illustrated in FIG. 6.

There may be slight misalignments between the sub-mirror 140 and the separating lens 153 due to various manufacturing and/or assembly tolerance range, which imprecision in alignment may result in an error in detecting the focus state of the photographing lens 110. As the incident angle of light entering the auto focus module 150 is larger, the error may become greater. If the AF area increases, the incident angle of light entering the auto focus module 150 may be larger, and accordingly a great error could occur in detecting the focus state of the photographing lens 110.

As shown in FIG. 6, according to an embodiment of the present disclosure, the plurality of reflective areas 140a, 140b and 140c may be arranged on the sub-mirror 140 in such a manner that the light reflected from the reflective areas 140a, 140b and 140c are incident on the separating lenses 153a, 153b and 153c, respectively. Accordingly, even with an increased AF area, the incident angle of the light incident on the separating lens 153 from the sub-mirror 140 may not increase. Accordingly, it is possible to provide an image pick-up apparatus that is robust to better withstand the manufacturing and/or the assembling imprecision.

Figure 7:
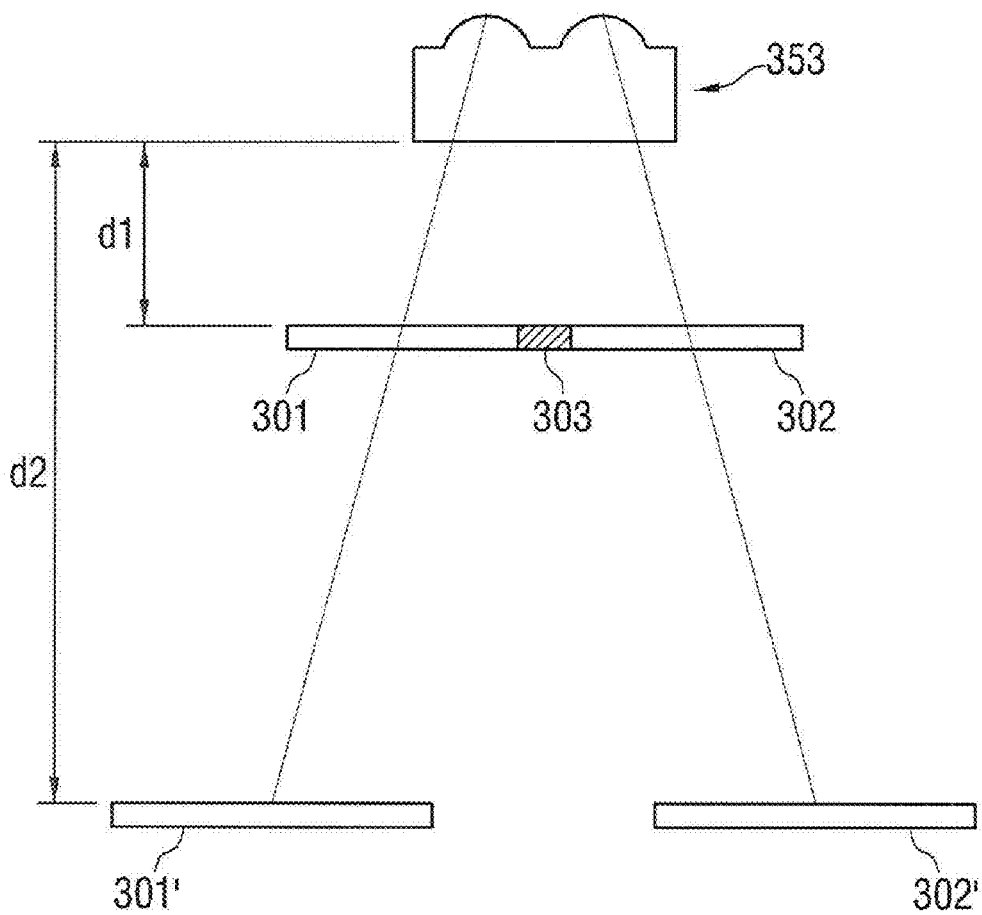
FIG. 7 illustrates an overlapping of a subject image on an auto focus sensor.

FIG. 7 illustrates an overlapping of a subject image formed on the auto focus sensor. If the auto focus sensor is separated from a separating lens 353 by a distance d1, a subject image 301 may overlap another subject image 302, resulting in an overlapped portion 303. Therefore, there may occur an error in detecting the focus state of the photographing lens 110. The overlapping could be prevented if the auto focus sensor is separated from the separating lens 153a by a sufficiently large distance, such as the distance d2 (that is longer than d1). When the AF area increases in size, the subject image formed on the auto focus sensor may also become larger, thus requiring the distance between the auto focus sensor and the separating lens to become longer, which in turn results in an increase in the size of the auto focus module.

However, according to an embodiment of the present disclosure, the plurality of reflective areas 140a, 140b and 140c may be formed on the sub-mirror 140 to divide the light such that the light reflected from the reflective areas 140a, 140b, 140c is incident on the separating lenses 153a, 153b, 153c, respectively. Subsequently, the subject image is divided and formed on the respective photoelectric elements 155a, 155b and 155c of the auto focus sensor 155. That is, the size of the image is reduced by ⅓ of the size of the entire subject image with reference to each of the respective separating lenses 153a, 153b and 153c. Accordingly, since the distance between the auto focus sensor and the separating lens can be kept short, it is possible to keep the auto focus module compact and to also keep the image pick-up apparatus 100 compact.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. An image pick-up apparatus comprising:
   a photographing lens configured to receive light from a subject;
   a main mirror configured to receive light from the photographing lens and to partially transmit therethrough the light received from the photographing lens;
   an auto focus module configured to detect a focus state of the photographing lens; and
   a sub-mirror comprising a plurality of reflective areas each configured to reflect a portion of the light transmitted through the main mirror and to direct the reflected portion of the light along an optical path from the sub-mirror to the auto focus module,
   wherein each of the plurality of reflective areas has a concave shape, and
   wherein the sub-mirror comprises a combination of concave surfaces each having a separate concave shape.

2. The image pick-up apparatus as claimed in claim 1, wherein the optical path from the sub-mirror to the auto focus module does not comprise a field lens.

3. The image pick-up apparatus as claimed in claim 1, wherein the plurality of reflective areas are arranged along a horizontal direction of the sub-mirror.

4. The image pick-up apparatus as claimed in claim 1, wherein the plurality of reflective areas are arranged along a vertical direction of the sub-mirror.

5. The image pick-up apparatus as claimed in claim 1, wherein the plurality of reflective areas comprises three reflective areas.

6. The image pick-up apparatus as claimed in claim 1, wherein the main mirror and the sub-mirror are arranged in such manner that the light reflected by the sub-mirror is reflected by the main mirror toward the auto focus module.

7. The image pick-up apparatus as claimed in claim 6, wherein the sub-mirror is arranged perpendicular to an optical axis of light passing through the photographing lens.

8. The image pick-up apparatus as claimed in claim 1, wherein a reflectivity of the main mirror is greater than or equal to about 60% and less than or equal to about 70%.

9. An auto focusing apparatus for detecting a focus state of a subject image of an image acquiring apparatus, the apparatus comprising:
   an auto focus module comprising one or more image sensors arranged along an optical path of light received from a subject so as to sense the subject image; and
   a sub-mirror arranged in the optical path between the subject and the auto focus module, the sub-mirror comprising a plurality of reflective areas each configured to reflect a portion of the light incident upon the sub-mirror and to direct the reflected portion of the light along an optical path from the sub-mirror to the auto focus module,
   wherein each of the plurality of reflective areas has a concave shape, and,
   wherein the sub-mirror comprises a combination of concave surfaces each having a separate concave shape.

10. The auto focusing apparatus as claimed in claim 9, wherein the optical path from the sub-mirror to the auto focus module does not comprise a field lens.

11. The auto focusing apparatus as claimed in claim 9, wherein the plurality of reflective areas are arranged along a horizontal direction of the sub-mirror.

12. The auto focusing apparatus as claimed in claim 9, wherein the plurality of reflective areas are arranged along a vertical direction of the sub-mirror.

13. The auto focusing apparatus as claimed in claim 9, wherein the plurality of reflective areas comprises three reflective areas.

14. The auto focusing apparatus as claimed in claim 9, further comprising:
   a main mirror arranged in the optical path upstream of the sub-mirror and configured to partially transmit light incident thereupon,
   wherein the main mirror and the sub-mirror are arranged in such manner that the light reflected by the sub-mirror is reflected by the main mirror toward the auto focus module.

15. The auto focusing apparatus as claimed in claim 14, wherein the sub-mirror is arranged perpendicular to an optical axis of light transmitted through the main mirror.

16. A sub-mirror capable of being arranged in an optical path of light between a subject of an image acquisition apparatus and an auto focus module of the image acquisition apparatus that detects a focus state of an image of the subject, the sub-mirror comprising:
   a plurality of reflective surfaces each configured to reflect a portion of the light incident upon the sub-mirror and to direct the reflected portion of the light along an optical path from the sub-mirror to the auto focus module,
   wherein each of the plurality of reflective surfaces has a concave shape and the sub-mirror comprising a combination of concave surfaces each having a separate concave shape, and
   wherein the sub-minor is arranged in the optical path downstream of a main mirror of the image acquisition apparatus in such manner that the light reflected by the sub-mirror is reflected by the main mirror toward the auto focus module.

* * * * *